United States Patent

Anderson et al.

[15] 3,696,154

[45] Oct. 3, 1972

[54] PERFLUORINATED ETHER SULFIDES

[72] Inventors: Richard W. Anderson, Hughie R. Frick, both of Midland, Mich. 48640

[73] Assignee: The Dow Chemical Company, Midland, Mich.

[22] Filed: June 12, 1970

[21] Appl. No.: 45,940

[52] U.S. Cl...............260/609 F, 252/71, 260/327 P, 260/544 F, 260/611 R
[51] Int. Cl.............................................C07c 149/26
[58] Field of Search.......................260/609 E, 609 F

[56] References Cited

UNITED STATES PATENTS 3,322,834   5/1967   Hill et al..................260/609 E

OTHER PUBLICATIONS

Hudlicky " Chemistry of Organic Fluorine Compounds", 69 & 98.

*Primary Examiner*—Lewis Gotts
*Assistant Examiner*—D. R. Phillips
*Attorney*—Griswold and Burdick, Jerome L. Jeffers and William R. Norris

[57] ABSTRACT

Disclosed are perfluorinated ether sulfides characterized by the formula:

$$R_fO-R-S-R-OR_f$$

In the above formula,

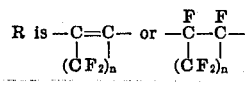

with $n$ being 2, 3 or 4 and $R_f$ is a perfluoroaliphatic group or a perfluoroaliphatic ether containing from one to 20 carbon atoms. The unsaturated compounds are prepared by reacting a perfluoroalkoxy perfluorocycloalkene of the formula:

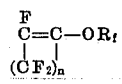

wherein $R_f$ and $n$ are as defined above with an alkali metal sulfide. Saturated perfluorinated either sulfides are prepared by adding fluorine across the double bond of the unsaturated compounds. These compounds are useful as hydraulic fluids for high temperature applications.

6 Claims, No Drawings

PERFLUORINATED ETHER SULFIDES

The invention herein described was made in the course of or under a contract or subcontract thereunder with the Department of the Navy.

The present invention involves novel perfluorinated ether sulfides and a method for their preparation. The perfluorinated ether sulfides are characterized by the formula:

$$R_f O-R-S-R-O R_f$$

In the above formula,

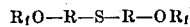

R is $-C=C-$ or $-C-C-$
       $|$           $| \ |$
      $(CF_2)_n$   $(CF_2)_n$ with $n$ being 2, 3 or 4. The symbol $R_f$ represents a perfluoro aliphatic group or a perfluoroaliphatic ether containing from one to 20 carbon atoms.

Due to their high fluorine content, these compounds exhibit good thermal and oxidation resistance. Since they are liquids, they are useful as hydraulic fluids for high temperature applications such as in braking systems.

In general, the compounds are prepared by reacting a perfluoroalkoxy perfluorocycloalkene of the formula

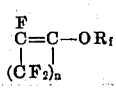

$$\begin{array}{c} F \\ C=C-OR_f \\ | \quad | \\ (CF_2)_n \end{array}$$

wherein $R_f$ and $n$ are as defined above with an alkali metal sulfide. Of the alkali metal sulfides, sodium sulfide is preferred. However, other alkali metal sulfides, e.g. $K_2S$, $Cs_2S$, $Rb_2S$ and $Li_2S$ also serve as sources of the sulfide ion. The reaction is carried out in a carrier liquid at a temperature within the range from −45° to −15° C.

After preparation of the unsaturated compound in the above described manner, the saturated compound is prepared by adding fluorine across the double bond.

The perfluoroalkoxy perfluorocycloalkene starting material is prepared by reacting a primary or secondary perfluorocarbonyl compound, i.e. perfluoro ketone or perfluoro acyl fluoride, with a perfluorocycloalkene in the presence of an alkali metal fluoride. The carbonyl compound is activated by the alkali metal fluoride to form the anion, $R_fO^-$, which when reacted with the perfluorocycloalkene forms the perfluoroalkoxy perfluorocycloalkene,

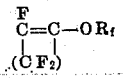

$$\begin{array}{c} F \\ C=C-OR_f \\ | \quad | \\ (CF_2) \end{array}$$

, starting material. The $R_f$ group of the anion is derived from the perfluoroaliphatic moiety of the carbonyl compound by addition of a fluoride ion from the alkali metal fluoride. For example, perfluoroacetone is activated by the alkali metal fluoride to form

$$\begin{array}{c} CF_3 \\ | \\ FC-O^- \\ | \\ CF_3 \end{array}$$

After reaction with the perfluorocycloalkene, the

$$\begin{array}{c} CF_3 \\ | \\ FC- \\ | \\ CF_3 \end{array}$$

group becomes $R_f$ in the intermediate and subsequently in the perfluorinated ether sulfide of the instant invention. Accordingly, the $R_f$ moiety in the ether sulfide is determined by the selection of a particular perfluoro carbonyl compound as a starting material.

The perfluoroaliphatic moiety, $R_f$, will be a secondary perfluoroaliphatic containing up to 20 carbon atoms when a perfluoro ketone of the formula

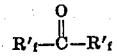

$$\begin{array}{c} O \\ \| \\ R'_f-C-R'_f \end{array}$$

is used as the carbonyl compound. In the above formula, $R'_f$ is a straight, branched or cyclic chain perfluoroaliphatic group. The $R'_f$ groups may be the same or different. Specific examples of $R'_f$ are perfluoro propyl, -hexyl, -heptyl, -octyl, -decyl, -tetradecyl and -hexadecyl. The combination of $R'_f$ groups in a given compound should contain a total of no more than 19 carbon atoms. Preferably, the secondary perfluoroaliphatic group is a perfluoroalkyl containing from three to six carbon atoms, i.e., the combined carbon atom content of $R'_f$ and $R'_f$ is from two to five.

The reaction of a perfluorocycloalkene with the anion formed by the reaction of an alkali metal fluoride with a cyclic perfluoroketone, e.g. perfluorocyclobutanone, perfluorocyclopentanone or perfluorocyclohexanone will result in the ether sulfide prepared from this intermediate having a cyclic $R_f$ moiety.

Perfluorinated ether sulfides having straight chain perfluoroaliphatic groups as $R_f$ result when a perfluoroaliphatic acyl fluoride, of the formula

$$\begin{array}{c} R''_fC=O \\ | \\ F \end{array}$$

in which $R''_f$ is a perfluoroaliphatic group having from one to 19 carbon atoms, is used to prepare the perfluoroalkoxy perfluorocycloalkene. Reaction of the acyl fluoride with the alkali metal fluoride catalyst produces the anion

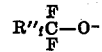

$$\begin{array}{c} F \\ | \\ R''_fC-O^- \\ | \\ F \end{array}$$

The

$$\begin{array}{c} F \\ | \\ R''_fC- \\ | \\ F \end{array}$$

portion of this anion becomes the $R_f$ moiety in the ether sulfide. Suitable $R''_f$ constituents are, for example, perfluoro ethyl, -butyl, -heptenyl, -nonyl, -dodecyl, -pentadecyl and -nonadecyl. Primary perfluorinated aliphatic moieties which are alkyl groups having from one to eight carbon atoms are preferred as $R_f$. The reaction of perfluoro octanoyl fluoride with the perfluorocycloalkene will produce an intermediate and ultimately an ether sulfide in which $R_f$ is perfluoro octyl.

The perfluorinated ether sulfides of the present invention are also prepared having as $R_f$ a perfluorinated aliphatic ether. These compounds are prepared by reacting a perfluorinated carbonyl compound having at least one ether linkage with a perfluorocycloalkene to form the intermediate. The etherated perfluoro carbonyl compound is prepared by reacting a perfluoro carbonyl compound with a perfluoro alkylene oxide. The following equation is illustrative of this reaction:

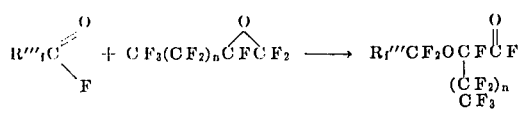

In the above formula $n$ is 0 to 4 and $R'''_f$ is perfluoroaliphatic having no greater than 17 carbon atoms. The $R'''_f$ moiety can also be F as in the case of carbonyl fluoride. Accordingly, when $n=0$, i.e. the alkylene oxide is propylene oxide and $R'''_f$ contains 17 carbon atoms, the resulting perfluoro carbonyl ether will contain 20 carbon atoms. An increase in the number of carbon atoms in the alkylene oxide will necessitate a decrease in the maximum number of carbon atoms permissible in the $R'''_f$ moiety to provide for a total of no greater than 20 carbon atoms in the perfluoro carbonyl ether. By reacting the perfluoro carbonyl ether with another perfluoro alkylene oxide, a carbonyl compound containing two ether linkages is prepared. Polyetherated perfluoro carbonyl compounds are prepared by repeated reaction of perfluoro acyl fluorides with perfluoro alkylene oxides. Reacting carbonyl fluoride with perfluoroethylene oxide produces a perfluoroaliphatic polyether containing nine ether linkages and a functional carbonyl group without exceeding 20 carbon atoms. Reaction of the etherated carbonyl group with a perfluorocycloalkene as described above produces a perfluoroalkoxycycloalkene in which the $R_f$ group is an etherated perfluoroaliphatic moiety containing up to 9 ether linkages and up to 20 carbon atoms. By reacting carbonyl fluoride with perfluoro propylene oxide and reacting this reaction product with a perfluorocyclo butene, -pentene or -hexene, an intermediate is obtained which when reacted with an alkali metal sulfide in the manner described herein will provide an ether sulfide in which $R_f$ is

The R moiety will be perfluorocyclobutene, perfluorocyclopentene or perfluorocyclohexene depending upon which perfluorocycloalkene is employed.

Co-pending application, Ser. No. 647,337 provides additional examples of preparation of the perfluoroalkoxy perfluorocycloalkene intermediate.

The preparation of the perfluorinated ether sulfides is achieved by reacting the intermediate

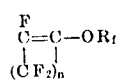

prepared as described above with an alkali metal sulfide in a carrier liquid. Carrier liquids suitable for use are those aprotic polar organic liquids which are inert to the reactants and products and will dissolve the reactants. Conveniently, the higher boiling ethers such as B,B'-dimethoxy-diethyl ether and 1,2-dimethoxyethane are used. Other solvents which may readily be employed are N,N-dimethylformamide, acetonitrile, tetramethylene sulfone and N,N-dimethylacetamide.

The ratio of reactants to be employed is not critical although stoichiometric amounts are conveniently used. The alkali metal sulfide is normally not employed in excess to avoid the occurrence of undesirable side reactions.

The reaction should be carried out at a temperature between −45° and −15° C. At temperatures below −45° C., the reaction does not proceed while at a reaction temperature above −15° C. the ether group is displaced with the result being the formation of a cyclic compound such as

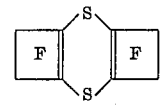

when a perfluorocyclobutenyl ether is reacted. A reaction temperature of from −40° to −25° C. is preferred for most efficient conversion to the desired product. A reaction period of from 1 to 10 hours is sufficient for substantial conversion at temperatures within the preferred range. After the reaction has gone to the desired stage of completion, the product is separated from the solvent by conventional liquid-liquid separatory techniques, e.g. distillation. Care must be taken to remove any unreacted alkali metal sulfide while the mixture is at the reduced temperature to avoid product degradation. Saturated compounds, i.e. those in which $\overline{R}$ is

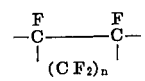

are prepared by adding fluorine across the double bond of the unsaturated compound. The fluorination is achieved by treating the unsaturated compound with a fluorinating agent capable of adding fluorine across a double bond at a temperature of from about 100° to 250° C. Certain metal fluorides, e.g. $CoF_3$, $PbF_4$, $SbF_5$, $AgF_2$, $MnF_3$, $CeF_4$ and $BiF_4$ are preferred fluorinating agents.

The invention is further illustrated by the following examples.

EXAMPLE I:

Into a 100 ml. round bottom flask were placed 1.67 gm. (0.0214 mole) of anhydrous sodium sulfide and 20 ml. of anhydrous acetonitrile. After this addition, which was carried out in a nitrogen filled dry box, the mixture was magnetically stirred while being cooled to −45° C. At this point 14.0 gm. (0.0427 mole) of perfluoro-1-isopropoxycyclobutene was added and the temperature maintained between −45° and −35° C. After three hours the reaction mass was analyzed by gas chromatography, and about 10 percent reaction was noted. After an additional two hours at −30° C., the reaction was about 50 percent complete and after an additional hour at −25° C. solids began to form. The reaction mixture was filtered giving 0.3 gm. of solid

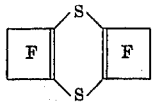

and a liquid containing 4.0 gm. (0.012 mole) of the starting fluorinated material and 8.5 gm. (0.013 mole) of bis(perfluoro-2-isopropoxy-1-cyclobutenyl) sulfide,

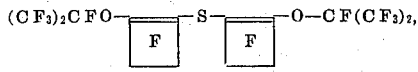

which boiled at 184° C. at 760 m.m. Hg. This represents a 90 percent yield and 61 percent conversion to the desired product.

The structure of the compound was confirmed by infrared spectroscopy and nuclear magnetic resonance. Elemental analysis was as follows:

|        | % C  | % F  | % S |
|--------|------|------|-----|
| Theory | 25.9 | 64.3 | 4.9 |
| Found  | 26.0 | 64.2 | 5.1 |

The thermal stability of the liquid product was determined by heating it in an evacuated sealed ampoule for two days at 250° C. Some discoloring but very little destruction of the sample was observed at the end of this period.

EXAMPLE II:

About 5.0 gm. (0.043 mole) of cobaltic trifluoride was placed into a 90 ml. monel cylinder which was then evacuated and treated with fluorine at 200° C. until no more fluorine was absorbed. The reactor was cooled to room temperature and excess fluorine removed. The cylinder was open in a nitrogen filled dry box and 6.0 gm. of bis(perfluoro-2-isopropoxy-1-cyclobutenyl) sulfide, prepared as in Example I, and dissolved in 4.0 ml. of trichlorotrifluoroethane was added. The mixture was heated for 23 hours at 150° C. and then filtered to remove $CoF_2$. The filter cake was washed with additional $CF_2ClCFCl_2$ and was added to the filtrate. The $CF_2ClCFCl_2$ was vacuum stripped from the filtrate at 0° C. About 5.6 gm. of product was recovered, which gas chromatographic analysis indicated to be 70 percent bis(perfluoro-2-isopropoxy-cyclobutyl) sulfide, B.P. 194° C. and 30 percent perfluoro-2-isopropoxy-1-cyclobutenyl perfluoro-2-isopropoxycyclobutyl sulfide, B.P. 196° C. The products were isolated by preparative scale gas chromatography.

The assigned structure was confirmed by infrared spectroscopy and nuclear magnetic resonance. The results of elemental analysis were as follows:

Elemental Composition

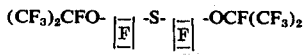

| | % C | % F | % S |
|---|---|---|---|
| Perfluoro-2-isopropoxy-1-cyclobutenyl perfluoro-2-isopropoxy-cyclobutyl sulfide | | | |
| Theory | 24.4 | 66.3 | 4.7 |
| Found | 24.3 | 66.6 | 4.9 |

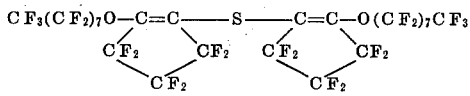

| | % C | % F | % S |
|---|---|---|---|
| Theory | 23.2 | 68.0 | 4.4 |
| Bis(perfluoro-2-isopropoxy-cyclobutyl) sulfide Found | 23.4 | 68.2 | 4.3 |

In an experiment similar to that conducted with the compound prepared as in Example I, the completely saturated compound was tested for thermal stability. It was found to be stable to excessive decomposition upon being maintained at 300° C. for two days.

The foregoing examples are illustrative of the preparation of the perfluoro ether sulfides of the present invention in which the cyclic structure contains four carbon atoms. Compounds in which the cyclic structure contains five and six carbon atoms are similarly prepared by reacting perfluorocyclopentene or perfluorocyclohexene with the perfluoro carbonyl compound to form the intermediate perfluoroalkoxy perfluorocycloalkene as previously described. Specific examples of compounds which are prepared by the present method are

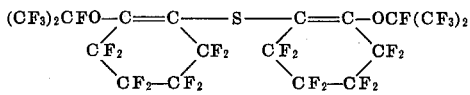

and

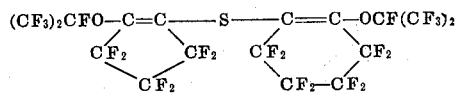

Reacting perfluoroisopropoxy perfluorocyclopentene and perfluoroisopropoxy perfluorocyclohexene with an alkali metal sulfide results in a perfluorinated ether sulfide having mixed cyclic moieties, i.e.

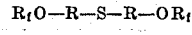

Addition of fluorine across the double bond of these compounds produces saturated ether sulfides.

We claim:

1. Perfluorinated ether sulfides characterized by the formula:

$$R_f O-R-S-R-OR_f$$

wherein

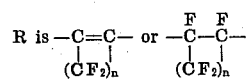

with $n$ being 2, 3 or 4 and $R_f$ is a perfluoroalkyl group or a perfluoroalkyl ether containing from one to 20 carbon atoms.

2. A compound as described in claim 1 wherein $R_f$ is a secondary perfluoroalkyl group containing from three to six carbon atoms.

3. A compound as described in claim 2 wherein $R_f$ is heptafluoroisopropyl and $\overline{R}$ is perfluorocyclobutenyl.

4. A compound as described in claim 3 wherein $\overline{R}$ is perfluorocyclobutyl.

5. A compound as described in claim 1 wherein $R_f$ is perfluoro octyl.

6. A compound as described in claim 1 wherein $R_f$ is $$CF_3OCFCF_2-$$
$$\phantom{CF_3O}|\phantom{CF_2-}$$
$$\phantom{CF_3O}CF_3$$

* * * * *

UNITED STATES PATENT OFFICE
CERTIFICATE OF CORRECTION

Patent No. 3,696,154          Dated October 3, 1972

Inventor(s) Richard W. Anderson & Hughie R. Frick

It is certified that error appears in the above-identified patent and that said Letters Patent are hereby corrected as shown below:

In the abstract, specification and claims wherever either R or $\widehat{R}$ appears, it is to be understood that there was meant an alicyclic group symbolically represented.

Column 3, line 50, "$\widehat{R}_f$" should be --$R_f$--.

Signed and sealed this 13th day of August 1974.

(SEAL)
Attest:

McCOY M. GIBSON, JR.                C. MARSHALL DANN
Attesting Officer                   Commissioner of Patents